Jan. 19, 1932.  G. H. NORTH  1,841,843

SHIM

Filed July 9, 1930

INVENTOR.
George H. North.
BY Walter N. Haskell,
his ATTORNEY.

Patented Jan. 19, 1932

1,841,843

UNITED STATES PATENT OFFICE

GEORGE H. NORTH, OF LA CROSSE, KANSAS, ASSIGNOR TO BEAR MANUFACTURING COMPANY, OF ROCK ISLAND, ILLINOIS

SHIM

Application filed July 9, 1930. Serial No. 466,719.

My invention relates to a shim, of that type which are used in the correction of a slight fault in the axle of an automobile, such as tends to cause a tilt or "caster" therein. On account of the vibration of the parts with which the shim is connected it has been found necessary to provide the shim with means for locking the same in place, such as lugs or auxiliary parts. The chief purpose of the present invention is to so construct the shim that it will be self-locking, with a tendency to automatically hold itself in position. This is accomplished without bending the ends of the shim, or otherwise changing the shape thereof, so that it can be readily removed from position on the axle should the occasion require.

In the drawings,—

Figure 1:
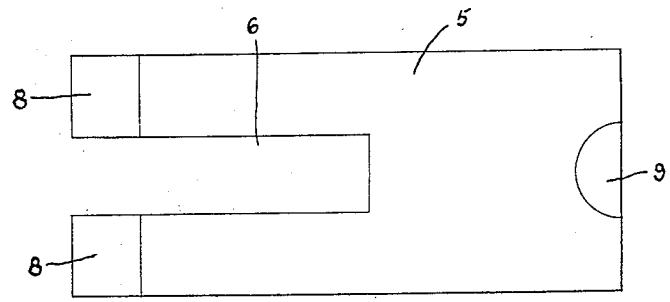
Fig. 1 is a plan view of the invention.
Figure 2:
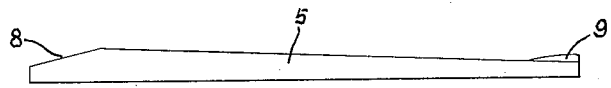
Fig. 2 is an edge view thereof.
Figure 3:
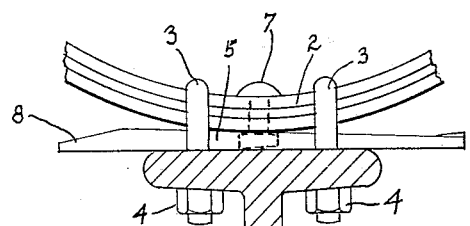
Fig. 3 is a fragmentary view of an axle and spring, with one of the shims in place between the same.

The reference number 1 indicates an axle of I-beam formation, to the upper flange of which is secured the leaves of a spring 2, by means of U-bolts 3 passing downwardly through openings in the flange and provided on their threaded ends with nuts 4. Adapted for insertion between the spring 2 and axle 1 is a plate 5, of wedge shape as shown, and provided in its thicker end with a recess 6, extending to the end of the plate. It has been found necessary to provide shims with a recess of this kind on account of its having been customary to unite the leaves of the spring by a bolt as at 7, which forms an obstacle to the positioning of a shim of the desired width.

To place the shim in position the connections for the spring and axle are loosened and the shim or plate 8 inserted between the same, as shown in Fig. 1. To facilitate the driving of the shim into position, if the same should be necessary, the thicker end of the shim is provided with beveled faces, as shown at 8, and the opposite end is fitted at a central point with a boss 9, against which blows may be struck with a hammer or other tool, without injuring the shim. As a general thing the shim is fully seated with the end of the recess 8 against the bolt 7 or nut on the inner end thereof. On account of the wedge shape of the shim if the same is at all loose there is a tendency of the vibratory action of the adjacent parts toward the left or thicker end thereof, but in the present device any such movement is prevented by reason of the recess 8 being disposed in the same direction. In case of said recess being projected toward the thin edge of the plate it will be obvious that it would not be a difficult matter for it to work out, unless some other means were to be provided to prevent the same. As the shim is formed in the present showing it is impossible for the same to work loose.

What I claim, and desire to secure, is:

In combination with the axle of an automobile and spring mounted thereon, a bolt passing through said spring, and a wedge-shaped plate between said axle and spring, provided with a recess extending into its thicker end to accommodate said bolt, and the bolt holding said plate from accidental release.

In testimony whereof I affix my signature.

GEORGE H. NORTH.